United States Patent
Conti et al.

(10) Patent No.: US 7,949,172 B2
(45) Date of Patent: May 24, 2011

(54) ITERATIVE IMAGE PROCESSING

(75) Inventors: Maurizio Conti, Knoxville, TN (US); Michael E. Casey, Louisville, TN (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 928 days.

(21) Appl. No.: 11/771,197

(22) Filed: Jun. 29, 2007

(65) Prior Publication Data

US 2008/0267477 A1    Oct. 30, 2008

Related U.S. Application Data

(60) Provisional application No. 60/914,389, filed on Apr. 27, 2007.

(51) Int. Cl.
*G06K 9/00* (2006.01)

(52) U.S. Cl. .................. 382/131; 382/254; 382/261

(58) Field of Classification Search .......... 382/131, 382/254, 261
See application file for complete search history.

(56) References Cited

U.S. PATENT DOCUMENTS

| | | | | |
|---|---|---|---|---|
| 6,463,181 | B2 * | 10/2002 | Duarte | 382/254 |
| 6,771,833 | B1 * | 8/2004 | Edgar | 382/254 |
| 6,836,558 | B2 * | 12/2004 | Doi et al. | 382/131 |
| 2007/0242867 | A1 * | 10/2007 | Jan et al. | 382/131 |
| 2007/0297660 | A1 * | 12/2007 | Hsieh et al. | 382/131 |

OTHER PUBLICATIONS

Kadrmas, "Statistically regulated and adaptive EM reconstruction for emission computed tomography", IEEE Trans. Nucl. Sci., vol. 48, No. 3, 790-798, 2001.*

Wesolowski et al., "Improved lesion detection from spatially adaptive, minimally complex, Pixon® reconstruction of planar scintigraphic images", Comp. Med. Imaging and Graphics, vol. 29, 65-81, 2005.*

* cited by examiner

*Primary Examiner* — Bhavesh M Mehta
*Assistant Examiner* — Stephen R Koziol
(74) *Attorney, Agent, or Firm* — Peter L. Kendall

(57) ABSTRACT

A method for processing an image which has the steps of a) receiving acquired data necessary to obtain an image and estimating a preliminary image; b) selecting at least one image element within the image; c) performing an iterative algorithm for processing the image at least on the at least one image element; d) computing a difference between the processed at least one image element and the at least one image element; and e) repeating the steps c) and d) until the difference is below a predefined threshold.

20 Claims, 6 Drawing Sheets ions. The introduction of the fast convergence Ordered Subset Expectation Maximization (OSEM) and the progress in computing speed made iterative algorithms the standard for clinical PET.

ITERATIVE IMAGE PROCESSING

CROSS REFERENCE TO RELATED UNITED STATES APPLICATIONS

This application claims priority from "A Statistical Method to Determine the Optimal Iteration Number in Iterative Reconstruction Algorithms", U.S. Provisional Application No. 60/914,389 of Conti, et al., filed Apr. 27, 2007, the contents of which are herein incorporated by reference.

TECHNICAL FIELD

The present invention concerns iterative image processing, for example, to reconstruct an image.

BACKGROUND

Digital or analog images, in particular in technical applications, often require processing, such as reconstructive processing, filtering, rendering, etc. In the medical field, image processing plays an important part providing a physician with better information by improving the ability to interpret images taken by medical imaging devices. An example for a medical application is Positron Emission Tomography (PET), where a short-lived radioactive tracer isotope, which decays by emitting a positron, is injected usually into the blood circulation of a living subject. After the metabolically active molecule becomes concentrated in tissues of interest, the research subject or patient is placed in the imaging scanner. The molecule most commonly used for this purpose is fluorodeoxyglucose (FDG), a sugar, for which the waiting period is typically an hour.

As the radioisotope undergoes positron emission decay, it emits a positron, the antimatter counterpart of an electron. After traveling up to a few millimeters the positron encounters and annihilates with an electron, producing a pair of gamma photons moving in almost opposite directions. These are detected in the scanning device by a detector assembly, typically a scintillator material coupled to a photomultiplier, which converts the light burst in the scintillator into an electrical signal. The technique depends on simultaneous or coincident detection of the pair of photons.

The raw data collected by a PET scanner are a list of 'coincidence events' representing near-simultaneous detection of annihilation photons by a pair of detectors. Each coincidence event represents a line in space connecting the two detectors along which the positron emission occurred. Coincidence events can be grouped into projections images, called sinograms. The sinograms are sorted by the angle of each view and tilt, the latter in 3D case images. Before reconstruction, pre-processing of the data is required such as, for example, correction for random coincidences, estimation and subtraction of scattered photons, attenuation correction, detector dead-time correction and detector-sensitivity correction.

Filtered back projection (FBP) has been frequently used to reconstruct images from the projections. This algorithm has the advantage of being simple and having a low requirement for computing resources, but it is characterized by high noise level and streak artifacts.

For smoother processing image of the data generated by PET scanners and other imaging devices (CT for example), iterative reconstruction methods are used. Such methods were introduced in PET technology in the early 1980's with the publishing of the Maximum Likelihood Maximization (MLEM) algorithm. However, slow convergence and inadequate computing power prevented a widespread diffusion. The introduction of the fast convergence Ordered Subset Expectation Maximization (OSEM) and the progress in computing speed made iterative algorithms the standard for clinical PET. The advantage is a better noise profile and resistance to the streak artifacts common with FBP, but the disadvantage is higher computer resource requirements. Moreover, in MLEM, OSEM and similar algorithms, the contrast recovery improves with the iteration number, but image noise also increases with the iteration number, and the balance of these two opposite parameters is commonly left to an arbitrary choice of when to stop the iterative process. Moreover, in the clinical practice, a fixed iteration number is a-priori selected and applied in all situations.

To improve an iterative process, a row-action maximum likelihood algorithm (RAMLA) has been introduced, in which the progress of iteration is damped by a relaxation parameter. The image noise and signal recovery are made to converge quickly to a solution and any farther iteration does not alter the noise level and contrast recovery. However, the choice of the relaxation parameter and its update law is again arbitrary and the result is equivalent to stopping the iterative algorithm at an arbitrary point.

In other technical fields of image processing, the optimal post smoothing, for example, of an astronomical image or of a planar scintigraphic image has been investigated and it has been found that a confidence test can be used in order to define the size of a local smoothing kernel. In these applications, the balance has to be found between large kernels which provide smooth images and small kernels which minimize the bias.

SUMMARY

An improved iterative image processing method able to adapt itself to the raw data and optimize the image quality for each data set, in particular in the medical field can be provided according to an embodiment by a method for processing an image which may comprise the steps of a) receiving acquired data necessary to obtain an image and estimating a preliminary image; b) selecting at least one image element within the image; c) performing an iterative algorithm for processing the image at least on the at least one image element; d) computing a difference between the processed at least one image element and the at least one image element; and e) repeating the steps c) and d) until the difference is below a predefined threshold.

According to another embodiment, a system for processing an image may comprise a processor receiving data defining an image, wherein the image processor is operable to determine at least one image element within the image, to perform an iterative algorithm for converting the at least one image element into a processed image element, to determine a difference between the at least one image element and the processed image element, and to repeat performing the iterative algorithm and the determination of the difference until a predefined threshold of the difference has been reached.

According to yet another embodiment, a system for processing an image may comprise processing means operable to receive data defining an image, to determine at least one image element within the image, to perform an iteration by an iterative algorithm for processing the image at least on the at least one image element, to determine a difference between the processed at least one image element and the at least one image element before performing the iteration, and to repeat the iteration and difference determination until the difference is smaller than a predefined threshold.

BRIEF DESCRIPTION OF THE DRAWINGS

A more complete understanding of the present disclosure thereof may be acquired by referring to the following description taken in conjunction with the accompanying drawings wherein.

DETAILED DESCRIPTION

Figure 1:
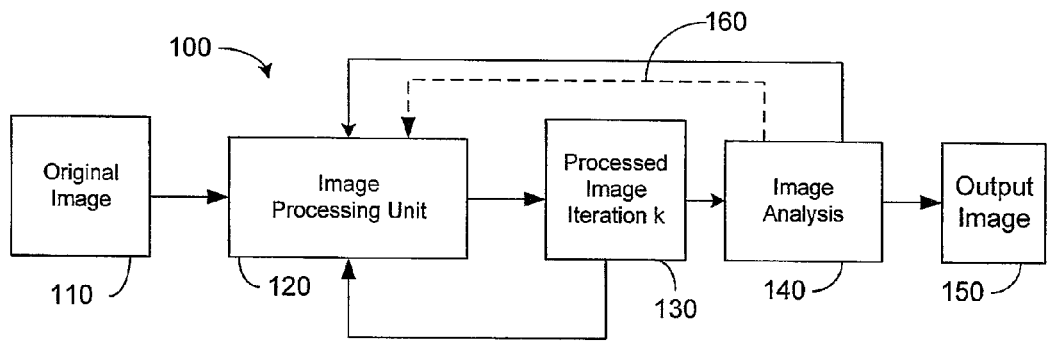
FIG. 1 shows an embodiment of an image processing system.

As stated above, according to an embodiment a method for processing an image may comprise the steps of a) receiving acquired data necessary to obtain an image and estimating a preliminary image; b) selecting at least one image element within the image; c) performing an iterative algorithm for processing the image at least on the at least one image element; d) computing a difference between the processed at least one image element and the at least one image element; and e) repeating the steps c) and d) until the difference is below a predefined threshold.

According to a further embodiment, the step of estimating a preliminary image may comprise the step of performing a first iteration of an iterative algorithm. According to a further embodiment, the step of computing the difference may comprise the step of estimating a standard deviation. According to a further embodiment, the step of computing the difference may comprises the step of using a statistical test, with a predefined threshold confidence level, to determine at what iteration the image elements of the image obtained at step c) are not statistically different from the image elements of a previous iteration. According to a further embodiment, the statistical test may be any embodiment of a Student's t-distribution test. According to a further embodiment, the image can be divided into a plurality of matrix cells and an image element is defined by at least one matrix cell. According to a further embodiment, a plurality of image elements can be selected and step c), d) and e) can be performed for each image element independently using an associated iterative algorithm. According to a further embodiment, a plurality of image elements can be selected and step c) may be performed for each image element independently and steps d) and e) are performed for a pre-selected image element. According to a further embodiment, the iterative algorithm can be adaptive. According to a further embodiment, the characteristics of at least one image element of the image may be used to perform an adaptation of the iterative algorithm. According to a further embodiment, a plurality of adaptive iterative algorithms can be used for image processing of a plurality of predetermined image elements. According to a further embodiment, the characteristics of at least one image element of the image can be used to perform an adaptation of an adaptive iterative algorithm for another image element. According to a further embodiment, the image can be divided into a plurality of matrix cells and each image element can be defined by at least one matrix cell, respectively. According to a further embodiment, the image may be a two-dimensional image. According to a further embodiment, the image may be a three or multi-dimensional image.

As stated above, a system for processing an image may comprise an image processor receiving data defining an image, wherein the image processor is operable to determine at least one image element within the image, to perform an iterative algorithm for converting the at least one image element into a processed image element, to determine a difference between the at least one image element and the processed image element, and to repeat performing the iterative algorithm and the determination of the difference until a predefined threshold of the difference has been reached.

According to a further embodiment, the image processor may determine whether the predefined threshold has been reached by a statistical confidence test. According to a further embodiment, the processor may determine whether the predefined threshold has been reached by any embodiment of a Student's t distribution test. According to a further embodiment, the image processor may be a digital signal processor or an application specific integrated circuit.

FIG. 1 shows an embodiment of an image processing system 100, for example, designed for image processing in a PET scanner. An original data set 110 as delivered, for example, by a PET scanner is fed to an image processing unit 120. The image processing unit 120 processes the image according to one or more predefined iterative algorithms and produces as an output image 130 or $M_k$, wherein k represents the iterative step. To illustrate the iteration, FIG. 1 shows that processed image 130 is fed back to the image processing unit 120 for further iterative steps k of the respective algorithm. In addition, according to an embodiment, an image analysis unit 140 may be provided. This unit 140, according to different embodiments, may be part of the image processing unit or may be provided separately. Image analysis unit 140 determines the state of image $M_k$ as will be explained in more detail below. This information is fed back to image processing unit 120 providing information about when the iterative process is to be stopped and the final result of the processed image at this stage has been reached. Once the final result has been achieved, the resulting image can be displayed on a suitable display and/or printed on a suitable medium. According to one embodiment, for example a filter used in the algorithm may be adaptive. Broken line 160 indicates the return of certain parameters to perform the adaptive filter function.

According to an embodiment, during an iterative reconstruction, an image is updated until the progress towards the "true" asyntothic image is overwhelmed by the noise increase or, in other words, when the noise level is larger than the image improvement. Thus, an objective, quantitative method aimed to assess the optimal local iteration number automatically is provided. This method provides for a good balance between contrast recovery and low noise level if iterative algorithms are used for image reconstruction. The criteria to assess this balance is based on a statistical confidence test.

In an iterative image reconstruction, at the end of each iteration k, an image $X_k$ is produced. If an image is divided into a plurality of image elements i, for example, using as matrix fields or cubes, $X_{k,i}$ and $X_{k+1,i}$ define the image element i at iteration k and k+1. According to an embodiment, the iteration process for an image element $X_{k,i}$ is terminated when it is assessed with a set confidence level that the successive iteration produces and image element $X_{k+1,i}$ which is not an improved image and/or cannot be considered statistically different from $X_{k,i}$. According to one embodiment, the criterium to establish if the two images are statistically different is a statistical test known as Student's t-distribution test. Also, any similar test based on the comparison of, for example, two mean values of two sample populations could be applied according to other embodiments. The process and the decision chain described above may be implemented in software, for example, as an algorithm. Thus, no human input is required.

The Student's t-distribution test is commonly used to determine with a confidence level of $(1-p_0)$ if two sample population are extracted from the same parent population. the Student's t-distribution test is based on an estimate of the mean values and standard deviations of the mean of the samples. For each iteration k+1, the statistical variable $t_i$ and the standard deviation $\overline{\sigma}_i$ could, for example, be defined as:

$$t_i = \frac{|\overline{X}_{k,i} - \overline{X}_{k+1,i}|}{\overline{\sigma}_i} \quad \text{Eq. (1)}$$

$$\overline{\sigma}_i^2 = \overline{\sigma}_{k,i}^2 + \overline{\sigma}_{(k+1),i}^2 \quad \text{Eq. (2)}$$

wherein $\overline{X}_{k,i}$ is the sample mean of the image element i at iteration k;
$\overline{\sigma}_{k,i}^2$ and $\overline{\sigma}_{k+1,i}^2$ are the corresponding standard deviations of the mean for element i in iteration k and k+1;
$\overline{\sigma}_{k,i}^2$ is the standard deviation of the mean, defined as $\overline{\sigma}_{k,i}^2 = \sigma_{k,i}^2/n_{k,i}$, and $n_{k,i}$ is the sample size used to evaluate the mean in location i and iteration k;
$d_i = n_{k,i} + n_{k+1,i} - 2$ are the degrees of freedom to be used in the test.

Once the confidence level $(1-p_0)$ has been chosen, one can find on the Student's t-distribution tables the corresponding value of $t_{p0}$ which is used for the comparison. For each iteration, the quantity $t_i$ is computed and compared with $t_{p0}$. If $t_i > t_{p0}$, it is concluded that the probability of selecting from two populations of identical images two samples which differ as much as (or more than) $\overline{X}_{k,i} - \overline{X}_{k+1,i}$ is lower than $p_0$ %, or in other words, the two images are different with a confidence of $(100-p_0)$ %. The iteration process is terminated when $t_i$ becomes less than $t_{p0}$.

In a first embodiment of the invention, as described above, the update equation of each image element in the iterative algorithm can be modified after the values are tested against the chosen confidence level and a local (pixel by pixel) optimal iteration number is therefore defined. The method in this embodiment can be defined fully spatially adaptive, since the reconstruction parameters are locally adapted and optimized for each image element.

In a second embodiment, the algorithm is partially spatially adaptive, a region of interest $ROI_i$ is selected, corresponding to a specific area, an organ or a lesion. In this case the image element $X_i$ is evaluated over the region of interest i defining, for each iteration k, the mean value $\overline{X}_{k,i}$ and the standard deviation $\overline{\sigma}_{k,i}^2$ in the region of interest i. The method described above is applied, but the confidence level test is performed only relative to the region of interest, and the iteration process is stopped for all image elements at the iteration number that optimize the image quality in the region of interest i.

All algorithms may be performed by a computer or an application specific integrated circuit (ASIC). If parallel processing is performed, a plurality of computers, signal processors or microprocessors may be used to process an image.

All embodiments can be applied to 2D images (planar image), 3D images (volume images) and 4D images (volume images acquired in different time frames).

Figure 2:
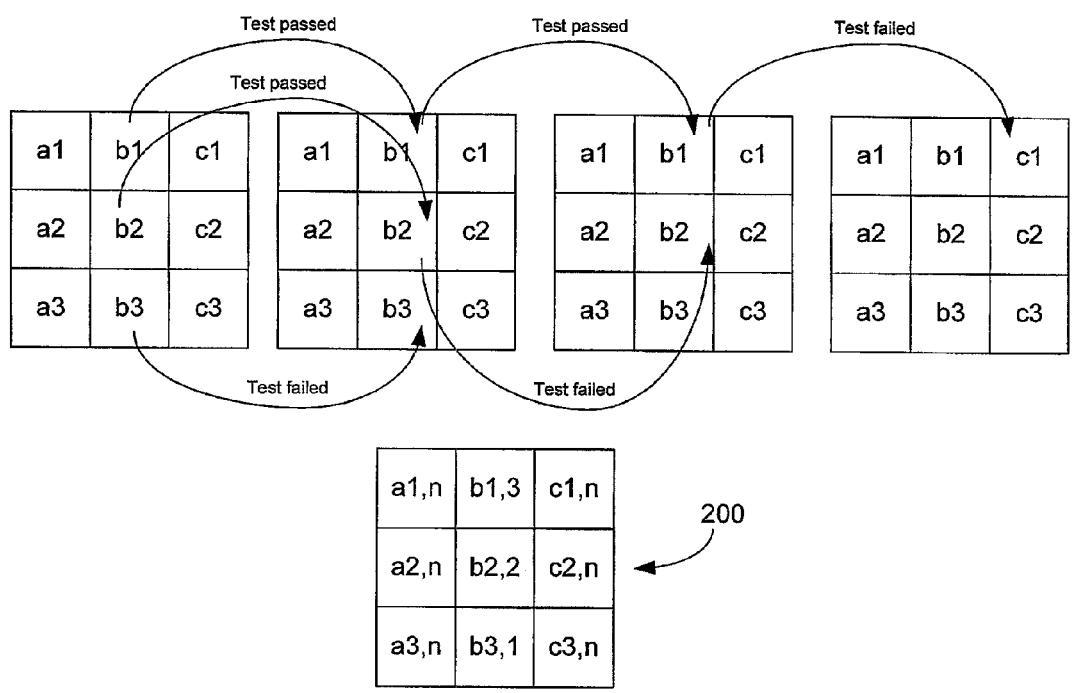
FIG. 2 illustrates an embodiment of a method to process a image showing a two-dimensional section.

FIG. 2 shows a example of image processing in a two dimensional space, for better understanding comprising only 3×3 image elements, named a1, a2, a3, b1, b2, b3, c1, c2, c3, wherein the first embodiment of the method (described above) is used. Each image element may represent a single pixel or may represent a region of the image. At each iteration of the reconstruction algorithm the confidence test is applied to each image element, and when the test is not passed the image element is not updated anymore. In this example the image element b3 fails the test at iteration 2, the image element b2 fails the test at iteration 3, the image element b1 fails the test at iteration 4. The final image 200 will comprise the following elements: b1,3 (element b1 obtained at the $3^{rd}$ iteration), b2,2 (element b2 obtained at the $2^{nd}$ iteration), b3,1 (element b3 obtained at the $1^{st}$ iteration). Only elements b are shown in the graph for clarity. However, the algorithm is similarly applied to elements a and c.

Figure 3:
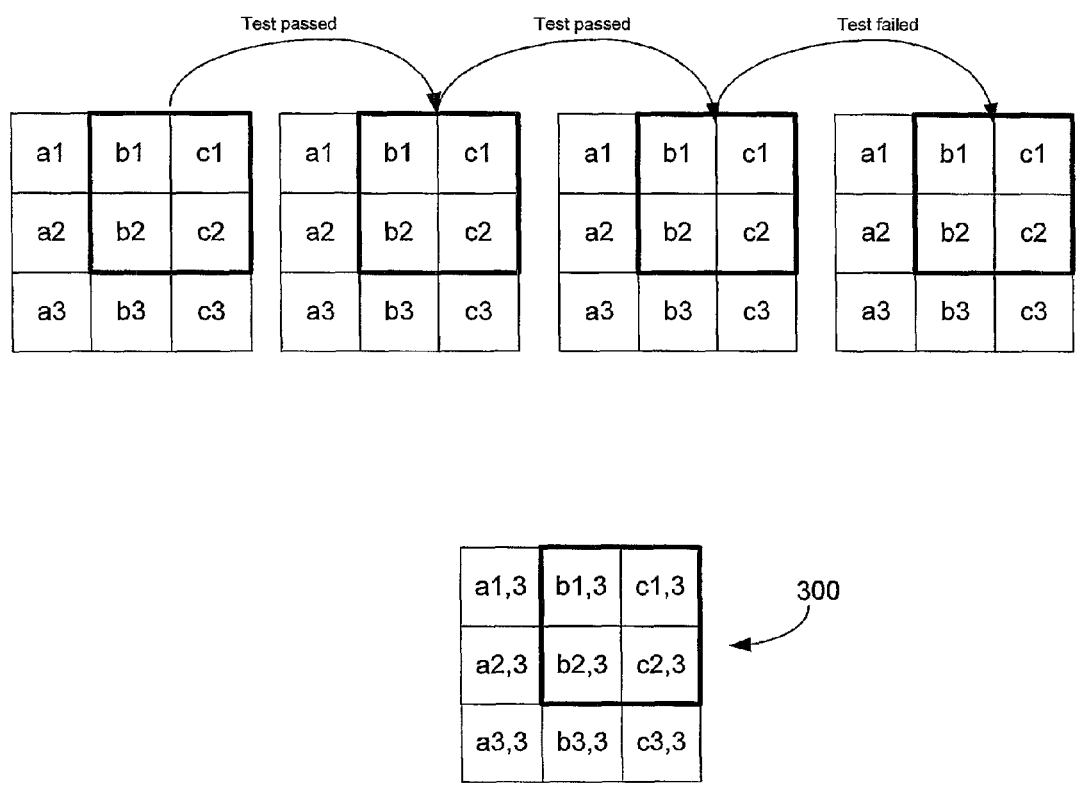
FIG. 3 illustrates another embodiment of a method to process a image showing a two-dimensional section.

FIG. 3 shows another example of image processing in a two dimensional space, again for better understanding comprising only 3×3 image elements, named a1, a2, a3, b1, b2, b3, c1, c2, c3, wherein the second embodiment of the method (described above) is used. A region of interest is selected, in this case comprising image elements b1, b2, c1, c2. At each iteration of the reconstruction algorithm the confidence test is applied only to the image elements in the region of interest, and the iterative process continues on the whole image until the test is failed in the region of interests. In this example, the region of interest fails the test at iteration 4, therefore all image elements are reconstructed with 3 iterations as shown in the final image 300.

Figure 4:
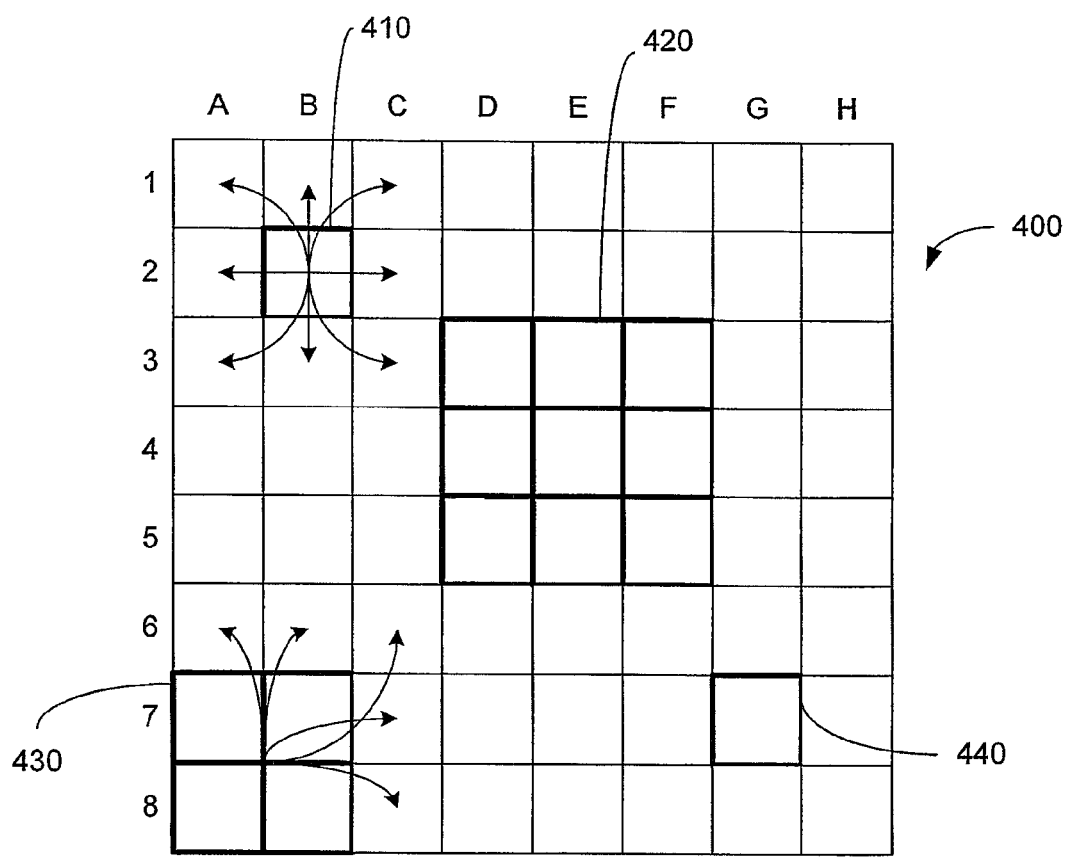
FIG. 4 illustrates another embodiment of a method to process an image showing a two-dimensional section.

FIG. 4 shows other examples using two-dimensions of how a specific algorithm may be applied to a specific image element or area of an image 400. To this end, FIG. 4 shows different embodiments in one matrix which can be applied in different forms and combinations or alone. A two dimensional part of an image 400 may be divided into a plurality of cells using matrix A . . . H and 1 . . . 8. Each cell may represent a single pixel or multiple pixels. According to a first embodiment, an image may comprise a plurality of image elements. Each image element may consist of one or more cells and can be defined differently. One or more iterative image processing algorithms may be applied to the image. According to one embodiment, the determination when an iteration is stopped can be determined by a pre-selected image element and its specific characteristics. Thus, even though all image elements or cells may be independently iterated, only one image element may be used to determine the threshold for stopping the image processing. For example, only image element 410 or 440 may be used to trigger the end of an image process. In one embodiment, image element 440 (cell G7) would affect the processing of all remaining cells. In another embodiment, image element 410 would also determine the end of iterations of only the surrounding cells A1, B1, C1, A2, C2, A3, B3, and C3. In this embodiment, the processing of the remaining cells would be influenced by other image elements. In another embodiment, multiple cells such as image elements 420 or 430 may be used in combination to trigger the end of image processing. In one embodiment, again each matrix cell of image elements 420 or 430 can be processed independently but the step of determining the end of the iteration is performed on the whole image element. However, in another embodiment, the image elements 420 or 430 as a whole may be processed and analyzed. If each matrix cell is processed independently, but the entire image element is used to determine the end of an iteration for this image element, for example, a statistical mean average parameter could be formed over the respective matrix cells.

As stated above with reference to the embodiment shown in FIG. 2, the plurality of image elements, may be processed independently wherein a threshold for the end of processing is determined for each image element individually. According to another embodiment, multiple matrix cells can be combined as shown with image element 430. Image element 430 may for example also determine the end of processing for surrounding cells A6, B6, C6, C7, and C8. Any other combination may be used to determine when processing for a particular image element or cell is stopped.

In addition, according to an embodiment, the respective algorithm used to perform an iteration may comprise adaptive filters which may depend on characteristics of the processed image. Thus, in case of a plurality of image elements, a plurality of adaptive image filters may be used individually for each image element. Again, as shown in FIG. 4, the adaptation of each filter may be performed for certain cells depending on the characteristics of another cell or image elements as indicated by the arrows. Thus, the content of a specific cell or image element may affect the algorithm used for another cell or image element. This adaptive process can be performed independently from the determination process. In other words, different cells or image elements may be defined to influence the adaptation of an algorithm than for determining the end of applying the respective algorithm.

Figure 5:
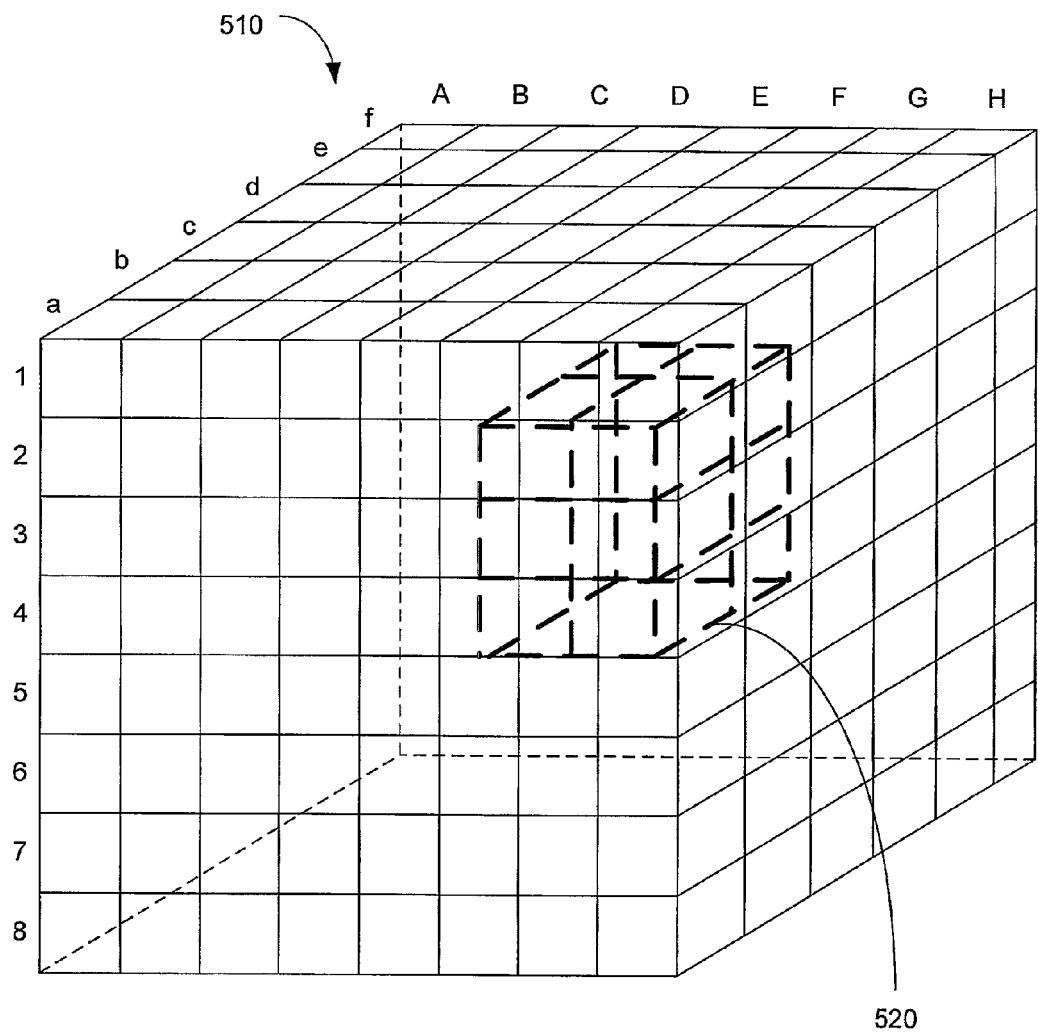
FIG. 5 illustrates another embodiment of a method to process an image showing a three-dimensional section.

FIG. 5 shows an embodiment for defining a three-dimensional image 510. Here, the principles as discussed with respect to FIG. 4 are extended in a third dimension. For example, as shown in FIG. 5, a three-dimensional image 510 is divided into a plurality of matrix cubes A . . . H, 1 . . . 8, a . . . f wherein each matrix cube may include a single or multiple pixels of an image. FIG. 5 shows a single highlighted image element 520 consisting of 12 matrix cubes E3c, F3c, E4c, F4c, E5c, F5c, E3d, F3d, E4d, F4d, E5d, and F5d. Image element 520 is shown as a cuboid. As previously stated, an image element may have any type of shape and can for example define a specific body region including a single or multiple organs. The respective shape is merely limited by the definition of the matrix cubes and the resulting image element. As shown in FIG. 5, only a single image element 520 is used to define the determination of the end of image processing. However, as stated before, multiple image elements can be used to individually determine an end for each image element process, an image element may determine the end of processing for surrounding cells or matrix cubes, etc. As stated above, the various embodiments disclosed can be further applied to more dimensions, for example a fourth dimension representing time may be used.

Figure 6:
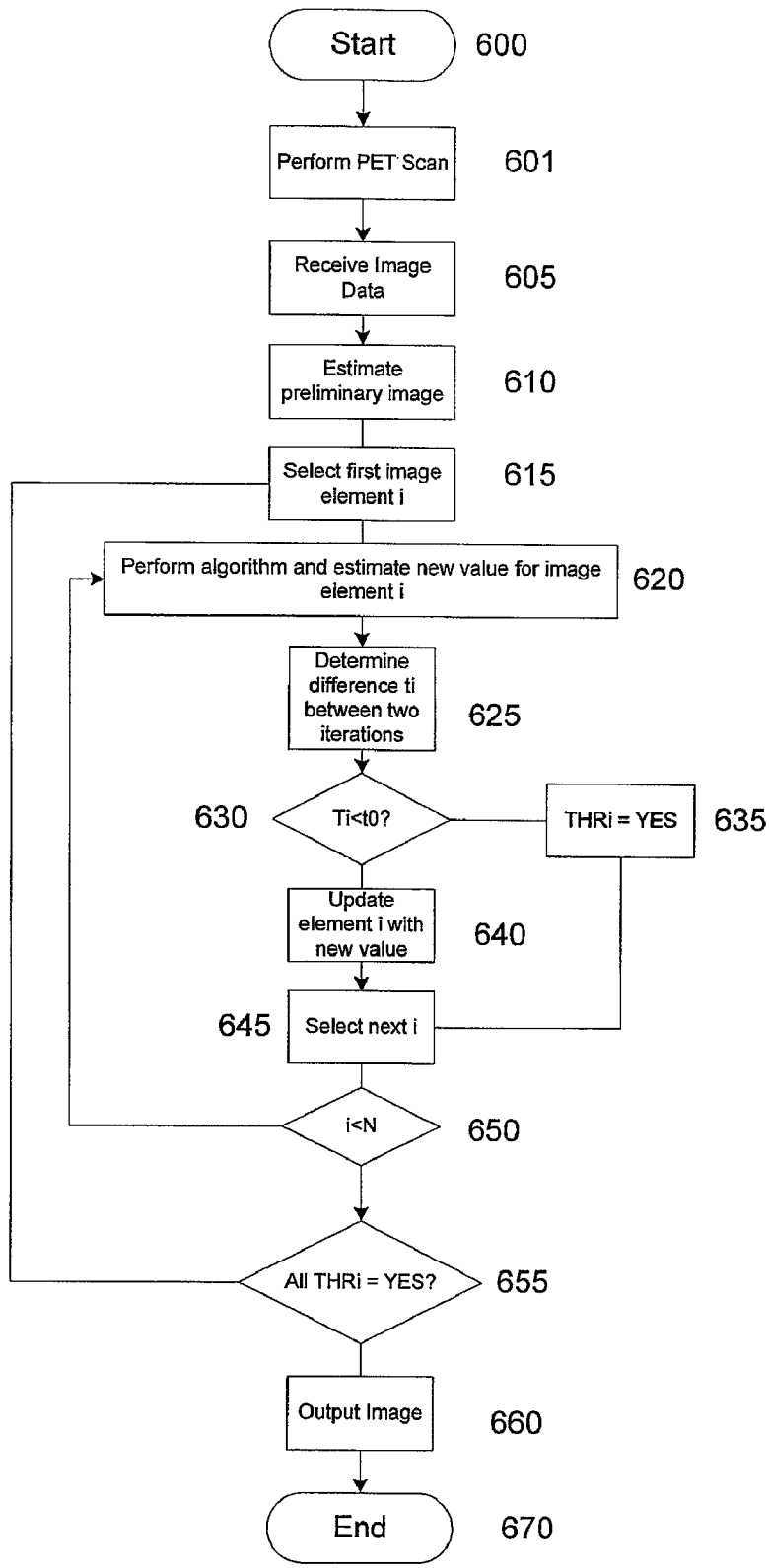
FIG. 6 shows an exemplary flow chart diagram of the method according to an embodiment
Figure 7:
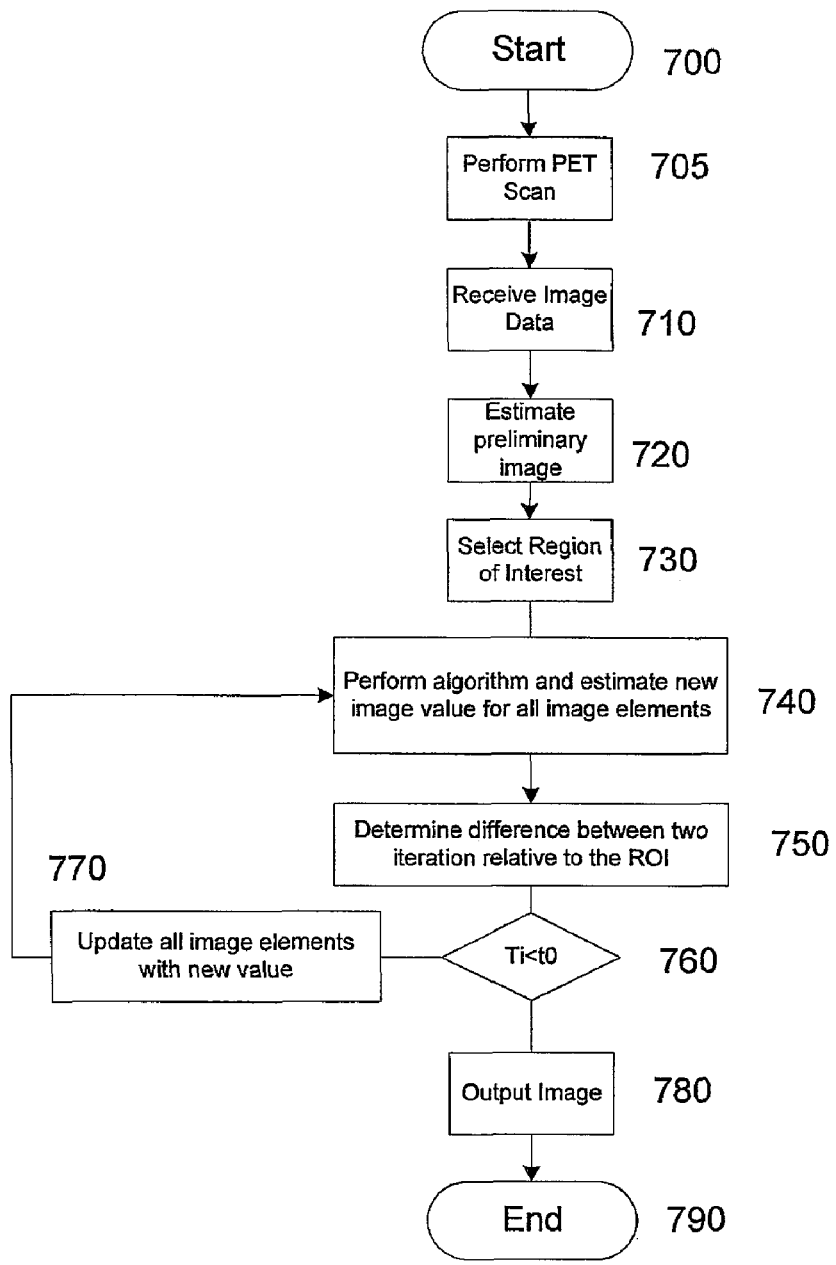
FIG. 7 shows an exemplary flow chart diagram of the method according to another embodiment While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

FIG. 6 shows an exemplary flow chart illustrating certain aspects of the first embodiment described above. The different variations explained above can be applied accordingly. The methods can be implemented in any suitable processor such as one or more digital signal processors. The routine starts in step 600. First an image scan is perform, for example, a PET scan in step 601. However, any other type of scanner which produces images that are suitable for the methods described above can produce the respective image data. In step 605, the image data is received and, for example, stored in a memory of the processing system. In step 610 a preliminary image is estimated, for example using a first iteration of the reconstruction algorithm. In step 615, a first image element i is selected. In step 620 a first iteration of a image reconstruction algorithm is performed, evaluating a new value for image element i. In step 625, a difference between two values relative to previous and present iteration is computed using any metric (for example the metric defined by the t-Student test). In step 630 such difference ti is compared with a predetermined threshold value t0 (for example related to a predetermined confidence level set using t-Student distribution): if ti is smaller than t0, the limit has been reached, a flag variable THRi is set to "yes" (step 635), and a new image element is selected for the update algorithm (step 645); if ti is not smaller than t0, the image element i is replaced with the new computed value, and a new image element is selected for the update algorithm (step 645). The next step 650 checks if the new image element i is the last in N total elements, in which case the routine passes to step 655: otherwise, the process is returned to step 620. Step 655 checks if all THRi (for all image elements) have been set to "yes", in which case the process ends and the final image is output in step 660; otherwise the routine returns to step 615.

FIG. 5 shows an exemplary flow chart illustrating certain aspects of the second embodiment described above. The method can be implemented in any suitable processor such as one or more digital signal processors. Again, the various embodiments disclosed above can be easily adapted to this embodiment. Moreover, various combinations of the embodiments disclosed may be applied to one image if desired. The routine starts at 700. First an image scan is perform, for example, a PET scan in step 705. However, any other type of scanner which produces images that are suitable for the methods described above can produce the respective image data. In step 710, the image data is received and, for example, stored in a memory of the processing system. In step 720 a preliminary image is estimated, for example using a first iteration of the reconstruction algorithm. In step 730, a Region Of Interest (ROI) is selected: an automatic or human guided system can be used to select the region of interest, which can consist of any number of image elements larger than 0 and equal or smaller than the total number of image elements N. In step 740 a first iteration of a image reconstruction algorithm is performed on all image elements, evaluating a new value for all image elements. In step 750, a difference between two values estimating the ROI portion of the image, relative to previous and present iteration is computed using any metric (for example the metric defined by the t-Student test). In step 760 such difference ti is compared with a predetermined threshold value t0 (for example related to a predetermined confidence level set using t-Student distribution): if ti is smaller than t0, the limit has been reached, the process is ended and the final image is output in step 780; otherwise all image elements are updated with the new values (step 770) and the routine returns to step 740.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for processing an image, comprising the steps of:
   a) receiving acquired data to obtain an image and estimating a preliminary image;
   b) selecting at least one image element;
   c) performing an iterative algorithm for processing said image at least on said at least one image element;
   d) computing a difference between the processed at least one image element and said at least one image element;
   e) repeating said steps c) and d) until said difference is below a predefined threshold,
      wherein the step of computing a difference further comprises comparing the processed at least one image element and the at least one image element while both are distinguishable and stopping the iterative algorithm when a comparison results in the processed at least one image element and the at least one image element becoming indistinguishable,
      wherein the processed at least one image element and the at least one image element are successive images,
      wherein the processed at least one image element and the at least one image element are indistinguishable when an arithmetic difference between a numerical value of one pixel in the at least one image element and a corresponding pixel in the processed at least one image element is below the predefined threshold.

2. The method according to claim 1, wherein the step of estimating a preliminary image comprises the step of performing a first iteration of an iterative algorithm.

3. The method according to claim 1, wherein the step of computing the difference comprises the step of estimating a standard deviation.

4. The method according to claim 1, wherein the step of computing the difference comprises the step of using a statistical test, with a predefined threshold confidence level, that the image elements of the image obtained at step c) are not statistically different from the image elements of a previous iteration.

5. The method according to claim 4, wherein the statistical test is any embodiment of a Student's t-distribution test.

6. The method according to claim 1, wherein the image is divided into a plurality of matrix cells and an image element is defined by at least one matrix cell.

7. The method according to claim 6, wherein a plurality of image elements are selected and step c), d) and e) are performed for each image element independently using an associated iterative algorithm.

8. The method according to claim 6, wherein a plurality of image elements are selected and step c) is performed for each image clement independently and steps d) and e) are performed for a pre-selected image element.

9. The method according to claim 1, wherein said iterative algorithm is adaptive.

10. The method according to claim 9, wherein the characteristics of at least one image element of the image is used to perform an adaptation of said iterative algorithm.

11. The method according to claim 7, wherein a plurality of adaptive iterative algorithms are used for image processing of a plurality of predetermined image elements.

12. The method according to claim 11, wherein the characteristics of at least one image element of the image is used to perform an adaptation of an adaptive iterative algorithm for another image element.

13. The method according to claim 12, wherein the image is divided into a plurality of matrix cells and each image element is defined by at least one matrix cell, respectively.

14. The method according to claim 1, wherein the image is a two-dimensional image.

15. The method according to claim 1, wherein the image is a three or multi-dimensional image.

16. A system for processing an image, comprising:
    an image processor receiving image data defining an image, wherein the image processor is operable to determine at least one image element within said image, perform an iterative algorithm, for converting said at least one image element into a processed image element, determine a difference between said at least one image element and said processed image element, and repeat performing said iterative algorithm and said determination of the difference until a predefined threshold of said difference has been reached,
    wherein the difference further comprises a comparison of the processed at least one image element and the at least one image element while both are distinguishable and a stop of the iterative algorithm when the comparison results in the processed at least one image element and the at least one image element becoming indistinguishable,
    wherein the processed at least one image element and the at least one image element are successive images,
    wherein the processed at least one image element and the at least one image element are indistinguishable when an arithmetic difference between a numerical value of one pixel in the at least one image element and a corresponding pixel in the processed at least one image element is below the predefined threshold.

17. The system according to claim 16, wherein the image processor determines whether the predefined threshold has been reached by a statistical confidence test.

18. The system according to claim 16, wherein the processor determines whether the predefined threshold has been reached by a Student's t distribution test.

19. The system according to claim 16, wherein said image processor is a digital signal processor or an application specific integrated circuit.

20. A system for processing an image, comprising
    processing means, executed on a processor, operable to
       receive image data defining an image;
       determine at least one image element within said image;
       perform an iteration by an iterative algorithm for processing said image at least on said at least one image element;
       determine a difference between said processed at least one image element and said at least one image element before performing said iteration;
       repeat said iteration and difference determination until said difference is smaller than a predefined threshold,
       wherein the difference further comprises a comparison of the processed at least one image element and the at least one image element while both are distinguishable and a stop of the iterative algorithm when the comparison results in the processed at least one image element and the at least one image element becoming indistinguishable,
       wherein the processed at least one image element and the at least one image element are successive images,
       wherein the processed at least one image element and the at least one image element are indistinguishable when an arithmetic difference between a numerical value of one pixel in the at least one image element and a corresponding pixel in the processed at least one image element is below the predefined threshold.

* * * * *